United States Patent
Kizawa

(10) Patent No.: US 7,634,801 B2
(45) Date of Patent: Dec. 15, 2009

(54) MULTIFUNCTION MACHINE AND PERSONAL AUTHENTICATION METHOD OF MULTIFUNCTION MACHINE

(75) Inventor: Makoto Kizawa, Yokohama (JP)

(73) Assignee: Panasonic Corporation, Osaka (JP)

( * ) Notice: Subject to any disclaimer, the term of this patent is extended or adjusted under 35 U.S.C. 154(b) by 534 days.

(21) Appl. No.: 10/893,279

(22) Filed: Jul. 19, 2004

(65) Prior Publication Data

US 2005/0152544 A1    Jul. 14, 2005

(30) Foreign Application Priority Data

| Jan. 9, 2004 | (JP) | ............... 2004-003839 |
| Jan. 9, 2004 | (JP) | ............... 2004-003840 |
| Jan. 21, 2004 | (JP) | ............... 2004-013419 |
| Jan. 21, 2004 | (JP) | ............... 2004-013420 |

(51) Int. Cl.
*G06F 7/04* (2006.01)
*G06F 21/00* (2006.01)
(52) U.S. Cl. ............... 726/4; 713/182; 380/55
(58) Field of Classification Search ......... 713/182; 726/16–21, 2, 4, 27; 380/55
See application file for complete search history.

(56) References Cited

U.S. PATENT DOCUMENTS

| 5,629,981 | A | * | 5/1997 | Nerlikar .................. 713/168 |
| 5,701,548 | A | | 12/1997 | Okatani |
| 2001/0048823 | A1 | | 12/2001 | Nomura et al. |
| 2002/0129250 | A1 | | 9/2002 | Kimura |
| 2003/0088570 | A1 | * | 5/2003 | Hilbert et al. ............. 707/100 |
| 2003/0105849 | A1 | | 6/2003 | Iwamoto et al. |
| 2003/0142990 | A1 | * | 7/2003 | Weaver ................... 399/80 |
| 2003/0167336 | A1 | | 9/2003 | Iwamoto et al. |

FOREIGN PATENT DOCUMENTS

| EP | 1320008 | 6/2003 |
| JP | 8-242326 | 9/1996 |
| JP | 9-168066 A | 6/1997 |
| JP | 10-315535 | 12/1998 |
| JP | 11-017862 A | 1/1999 |
| JP | 11-143651 | 5/1999 |

(Continued)

OTHER PUBLICATIONS

English Language Abstract of JP2001-292262.

(Continued)

*Primary Examiner*—Eleni A Shiferaw
(74) *Attorney, Agent, or Firm*—Greenblum & Bernstein, P.L.C.

(57) ABSTRACT

A multifunction machine and a personal authentication method are provided in which information is exchanged between the multifunction machine and a memory card by the RF-ID method. The multifunction machine reads identification information of a user from the memory card through a wireless wave without contact. The read identification information is send to a server to inquire whether the user is registered. A personal information table is obtained from the server, when the user is authenticated. The personal information table includes a customized menu and a training menu. The training menu includes setting information when the customized menu was selected in the immediately previous operation. The obtained customized menu and setting information of the training menu are displayed on a panel of the multifunction machine.

10 Claims, 13 Drawing Sheets

FOREIGN PATENT DOCUMENTS

| | | | |
|---|---|---|---|
| JP | 2000-079744 | A | 3/2000 |
| JP | 2000-321938 | A | 11/2000 |
| JP | 2001-024824 | A | 1/2001 |
| JP | 2001024824 | * | 1/2001 |
| JP | 2001-292262 | | 10/2001 |
| JP | 2001-334735 | A | 12/2001 |
| JP | 2002-007264 | | 1/2002 |
| JP | 2002-152446 | A | 5/2002 |
| JP | 2003-233725 | | 8/2003 |
| KR | 2002-70142 | | 9/2002 |
| WO | 97/38523 | | 10/1997 |

OTHER PUBLICATIONS

English Language Abstract of JP 2002-007264.
English Language Abstract of JP 10-315535.
English Language Abstract of JP 11-143651.
English Language Abstract of JP 2003-233725.
English Language Abstract of JP 8-242326.
U.S. Appl. No. 11/065,083 to Nishizawa et al., filed Feb. 25, 2005.
U.S. Appl. No. 11/065,076 to Nishizawa et al., filed Feb. 25, 2005.
U.S. Appl. No. 11/065,571 to Nishizawa et al., filed Feb. 25, 2005.
U.S. Appl. No. 11/065,372 to Nishizawa et al., filed Feb. 25, 2005.
U.S. Appl. No. 11/065,368 to Nishizawa et al., filed Feb. 25, 2005.
U.S. Appl. No. 11/065,373 to Nishizawa et al., filed Feb. 25, 2005.
English Language Korea 2002-70142.
English language Abstract of JP 2000-321938 A (Nov. 24, 2000).
English language Abstract of JP 9-168066 A (Jun. 24, 1997).
English language Abstract of JP 2001-024824 A (Jan. 26, 2001).
English language Abstract of JP 2000-079744 A (Mar. 21, 2000).
English language Abstract of JP 11-017862 A (Jan. 22, 1999).
English language Abstract of JP 2002-152446 A (May 24, 2002).
English language Abstract of JP 2001-334735 A (Dec. 4, 2001).

* cited by examiner

Fig.4 data structure of training menu table

| training menu table n (MSB:registration information) |
|---|
| resolution information |
| paper feed setting |
| paper catch setting |
| paper size |
| number of copies |
| finisher information |
| number of destinations (telephone number) |
| destination telephone number 1 |
| ⋮ |
| destination telephone number n |
| number of destinations (mail addresse) |
| mail address 1 |
| ⋮ |
| mail address n |

Fig.7(a)

You are not a registered user.
Please register for an user to a system.

Fig.7(b)

Mr. X X X, You were confirmed
as a registered user.

table information in memory card table information in server

MULTIFUNCTION MACHINE AND PERSONAL AUTHENTICATION METHOD OF MULTIFUNCTION MACHINE

BACKGROUND OF THE INVENTION

1. Field of the Invention

This invention relates to a multifunction machine that has plural functions, such as a copy function, scanner function, etc., and a personal authentication method of such a multifunction machine.

2. Description of Related Art

Conventionally, a multifunction machine having a user authentication function is developed for security and consumable management. For example, only the user registration information that satisfies registration requirements is stored in a user registration information file. A user is allowed to use the multifunction machine only when the user inputs user registration information that is confirmed being stored in the user registration information file. (Japanese Laid-Open Publication No. 2001-292262).

The conventional multifunction machine requires the user to input user authentication information through a touch panel or a keyboard. Accordingly, a smooth operation is disturbed when the user wants to use the multifunction machine immediately or frequently. Alternatively, there is an authentication method in which a card having authentication information is inserted into a multifunction machine to read the user authentication information. However, the card insertion operation impedes a smooth operation.

SUMMARY OF THE INVENTION

The present invention is provided to address the above-described problems. The purpose of the present invention is to provide a multifunction machine and a personal authentication method that enable personal authentication without any user's operation for the personal authentication, and that enable a user to move smoothly from the personal authentication to the next operation based on the personal authentication. Thus, the operability will be substantially improved.

According to the present invention, a multifunction machine reads user identification information from a memory card over a radio without any contact, sends the identification information read from the memory card to a server to inquire whether user personal information is registered, and displays a message indicating that the user is authenticated, when the registration is confirmed.

According to another aspect of the present invention, a customized menu for the authenticated user is retrieved from a server, and the retrieved customized menu is displayed.

According to the further aspect of the present invention, a multifunction machine is provided including an information reader that reads user identification information from a memory card over a radio without contact, a storage unit that stores personal information to identify an individual or a group, an authentication unit that performs authentication by comparing the identification information read from the memory card with the personal information stored in the storage unit, and a display that displays a result of the authentication.

According to the multifunction machine thus structured, personal authentication can be performed without any user's operation for the personal authentication.

The storage unit can store user customized menus in association with the personal information, and the display can display the customized menu corresponding to the authenticated user.

According to the above-described multifunction machine, personal authentication can be performed without any user's operation for authentication, and the user can move to a menu selection operation smoothly, because the customized menu, which is registered individually, is displayed.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 4 is an example of data structure of the training menu table shown in FIG. 3.

FIG. 7A is an example of a display of an authentication result for an unregistered user.

FIG. 7B is an example of a display of an authentication result for a registered user.

DETAILED DESCRIPTION OF PREFERRED EMBODIMENTS

Figure 1:
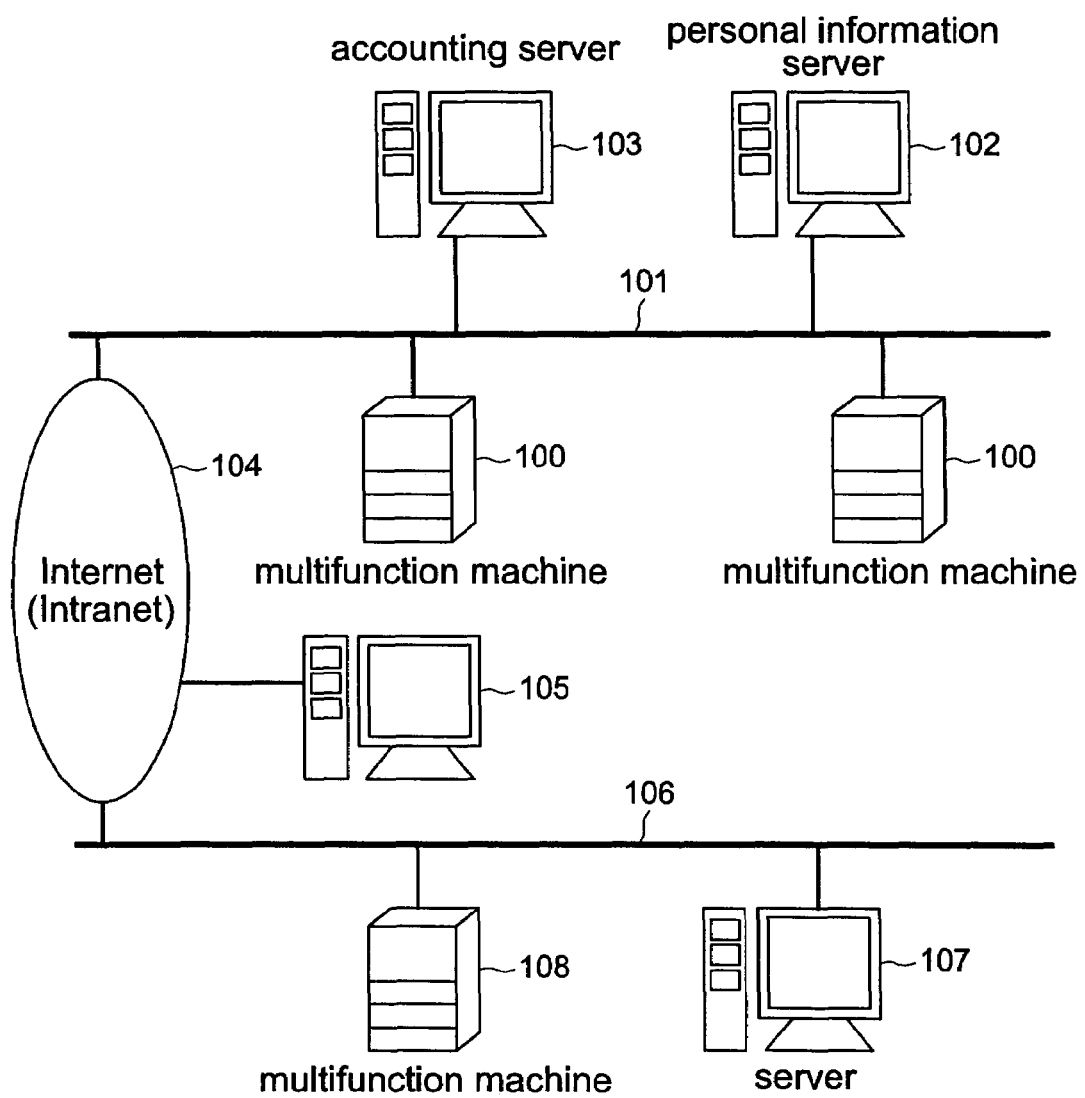
FIG. 1 is a system configuration used with a multifunction machine according to an embodiment of the present invention.

FIG. 1 is a system configuration diagram illustrating a network multifunction machine system according to an embodiment of the present invention. Multifunction machine 100 is connectable to personal information server 102 and accounting server 103 provided on LAN 101. Two multifunction machines 100, which have an identical function, are shown on LAN 101. LAN 101 is connected to Internet 104. WEB server 105 is connected to Internet 104. LAN 101 is connected to another LAN 106 through Internet 104. On LAN 106, another server 107 and multifunction machine 108 are provided. For example, a network configuration can be provided with LAN 101 and LAN 106, respectively provided in two separate business offices, and an Intranet connecting LAN 101 and LAN 106. The present embodiment explains personal authentication, customized menu delivery and customized menu execution performed on multifunction machine 100 and personal information server 102.

Figure 2:
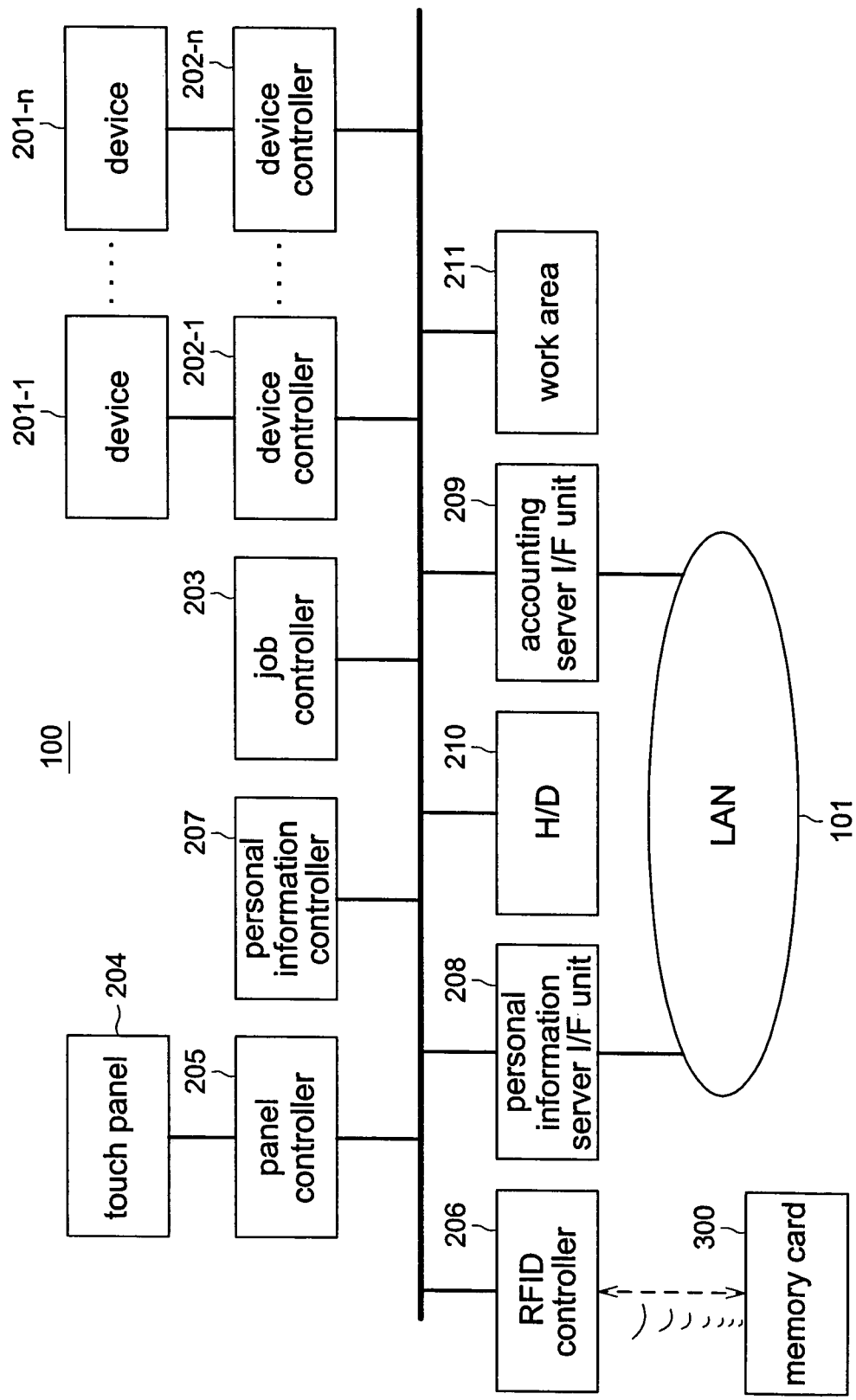
FIG. 2 is a functional block diagram of a multifunction machine according to the first embodiment of the present invention.

FIG. 2 is a block diagram illustrating functional configuration of multifunction machine 100 of the present invention. Multifunction machine 100 has devices 201-1 through 201-*n* (n: natural number), including a modem for facsimile communication, a printer for printing print data, and a scanner that scans an original to read image data. Device controllers 202-1 through 202-*n* (n: natural number) control these devices. Hard disk (H/D) 210 stores control programs for these devices. Job controller 203, which is implemented by a CPU, reads and executes the programs to give control commands to device controllers 202-1 through 202-*n*. Touch panel 204 functions as a user interface. Touch panel 204 displays menus and detects user's operation (selected commands). Panel controller 205 controls touch panel 204. Thus, the above-described function blocks realize basic (fundamental) functions of the multifunction machine.

Multifunction machine 100 has RFID controller 206 that detects contents (data) stored in memory card 300 over a radio (through a wireless wave). When RFID controller 206 radiates a magnetic field toward memory card 300, the returned magnetic field includes effects (information) based on the contents stored in memory card 300. RFID controller 206 detects the contents stored in memory card 300 from the returned magnetic field. In this embodiment, the magnetic field radiated by RFID controller 206 toward memory card 300, and the returned magnetic field are called a "wireless wave." RFID controller 206 reads registration data from and writes new registration data into memory card 300 through the wireless wave without contact, when memory card 300 is present in a detectable area. Personal information controller 207 manages registration data read from memory card 300 and a writing address to write new registration data. Personal information server I/F unit 208 is an interface to access personal information server 102 provided on LAN 101. Accounting server I/F unit 209 is an interface to access accounting server 103. RFID controller 206 detects registration information in memory card 300, and personal information controller 207 performs personal authentication at personal information server 102 based on the registration information.

Multifunction machine 100 stores control programs that control operations of devices 201-1 through 201-*n* and other programs. Multifunction machine 100 expands data in work area 211 to perform necessary jobs.

Figure 3:
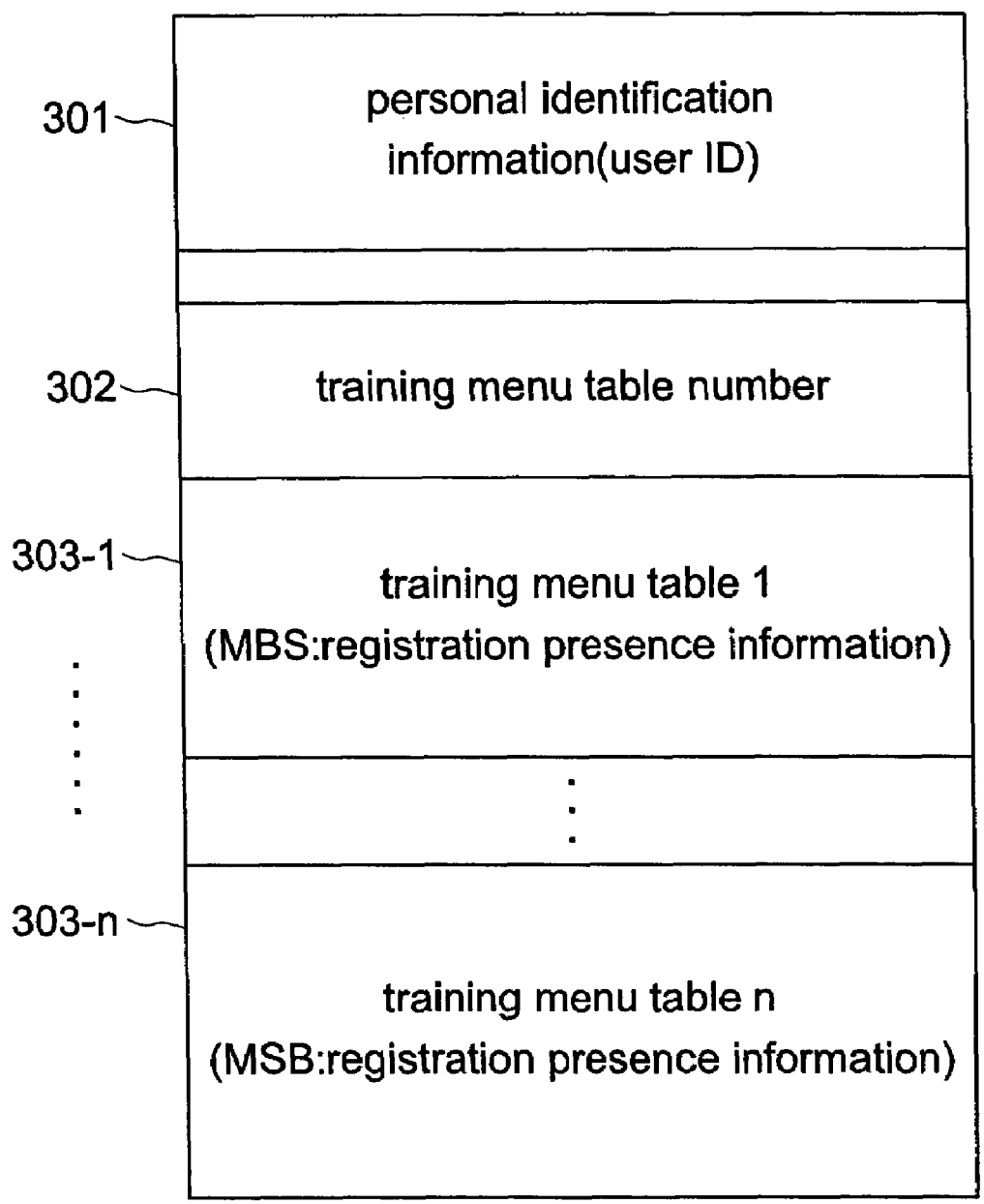
FIG. 3 is an example of data structure stored in a memory card.

Details of registration information stored (registered) in memory card 300 are explained. FIG. 3 is an example of data structure of registration information stored in memory card 300. The registration information includes user ID 301, which is personal identification information, training menu table number 302 and training menu tables 303-1 through 303-*n* (n: natural number). Personal information server 102 can store individual customized menus for each user, and multifunction machine 100 can read the customized menus and give commands to execute the customized menus. Memory card 300 stores training results, which are setting data of multifunction machine 100 when the customized menus were executed in the past. For example, when an owner of memory card 300 has registered four customized menus in personal information server 102, and each customized menu was executed in the past, memory card 300 stores four training menu tables 303-1 through 303-4 corresponding to the four customized menus. Each of the four training menu tables 303-1 through 303-4 includes setting data at the time of last execution of a corresponding customized menu. The training menu table includes setting items necessary for execution of customized menus. In this embodiment, all menus executable at multifunction machine 100 are itemized.

Detailed data structure of the training menu table is explained with reference to FIG. 4. The training menu table includes resolution information, paper feed setting, paper catch setting, paper size, number of copies, and finisher information as items associated with menus to perform copy, scanner and printer functions. The training menu table further includes the number of destinations (telephone numbers), individual destination telephone numbers, the number of destinations (mail addresses), and individual mail addresses as items associated with menus to perform a FAX function and an electronic mail function.

Figure 5:
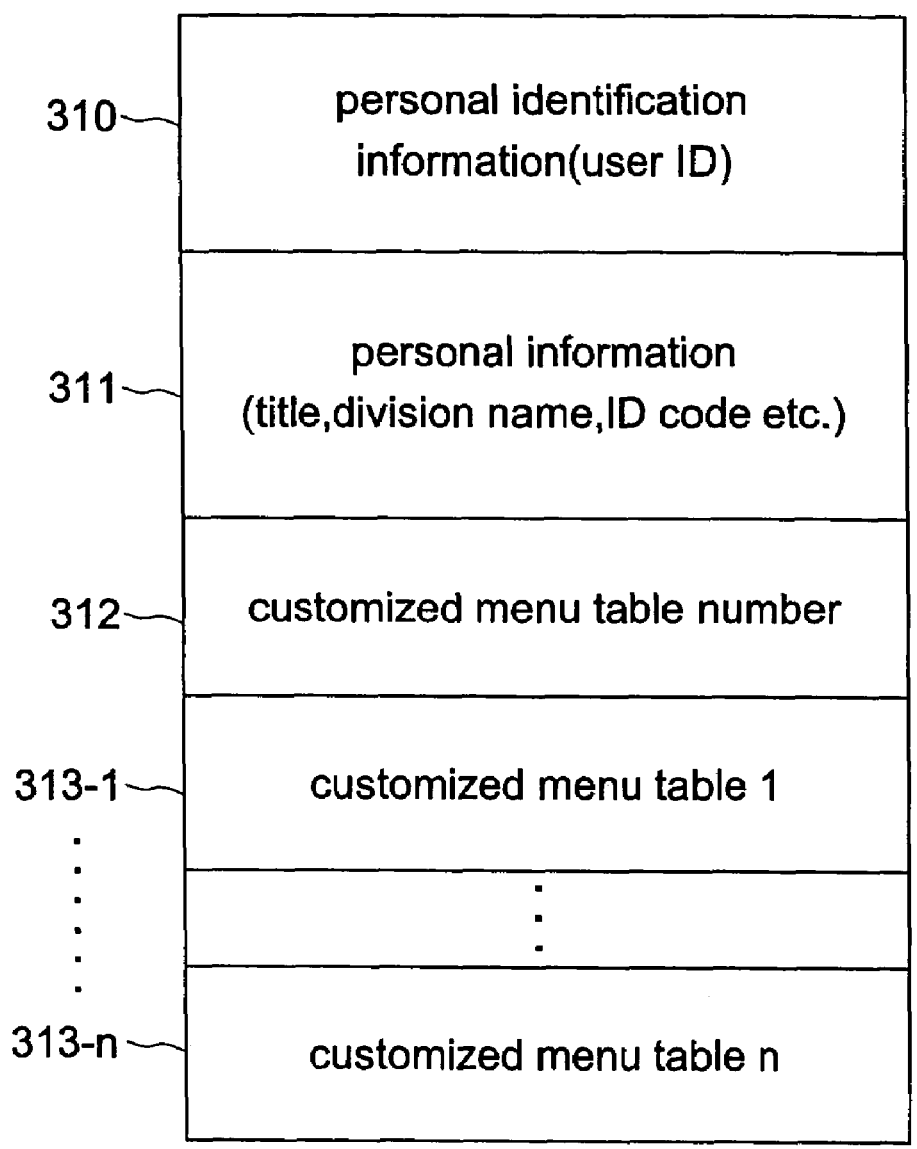
FIG. 5 is an example of data structure of a personal information table registered in a personal information server.

Personal information server 102 can store a personal information table for each user. FIG. 5 is an example of data structure of the personal information table. The personal information table includes user ID 310, which is personal identification information, personal information 311, which includes a division name, etc., registered customized menu table number 312, and registered customized menu tables 313-1 through 313-*n* (n: natural number). User ID 310 is common to user ID 301 shown in FIG. 3. Personal information 311 includes a name of individual, division name, and ID codes other than the user ID in this embodiment, but not limited to, as long as the information relates to the individual (user). Customized menu tables 313-1 through 313-*n* include customized menus registered in personal information server 102 by an individual of user ID 310. For example, menu names of customized menus are set "meeting materials," "pamphlet distribution," and so on. The customized menu table data is sent to multifunction machine 100, and the "menu name" of the customized menu is displayed on a panel.

In this embodiment, when multifunction machine 100 performs a job related to a menu selection, a server controls multifunction machine 100 by the remote procedure method. The server stores control programs to control multifunction machine 100 by the remote procedure method and other necessary data. In particular, WEB server 105 controls multifunction machine 100 using the remote procedure method in this embodiment. After a selection of menus displayed at (on) multifunction machine 100, WEB server 105 takes over the rest of the process. Therefore, information used by WEB server 105 to take over (including a URL of WEB server 105) is stored in table data of each customized menu table 313-1 through 313-*n*.

Figure 6:
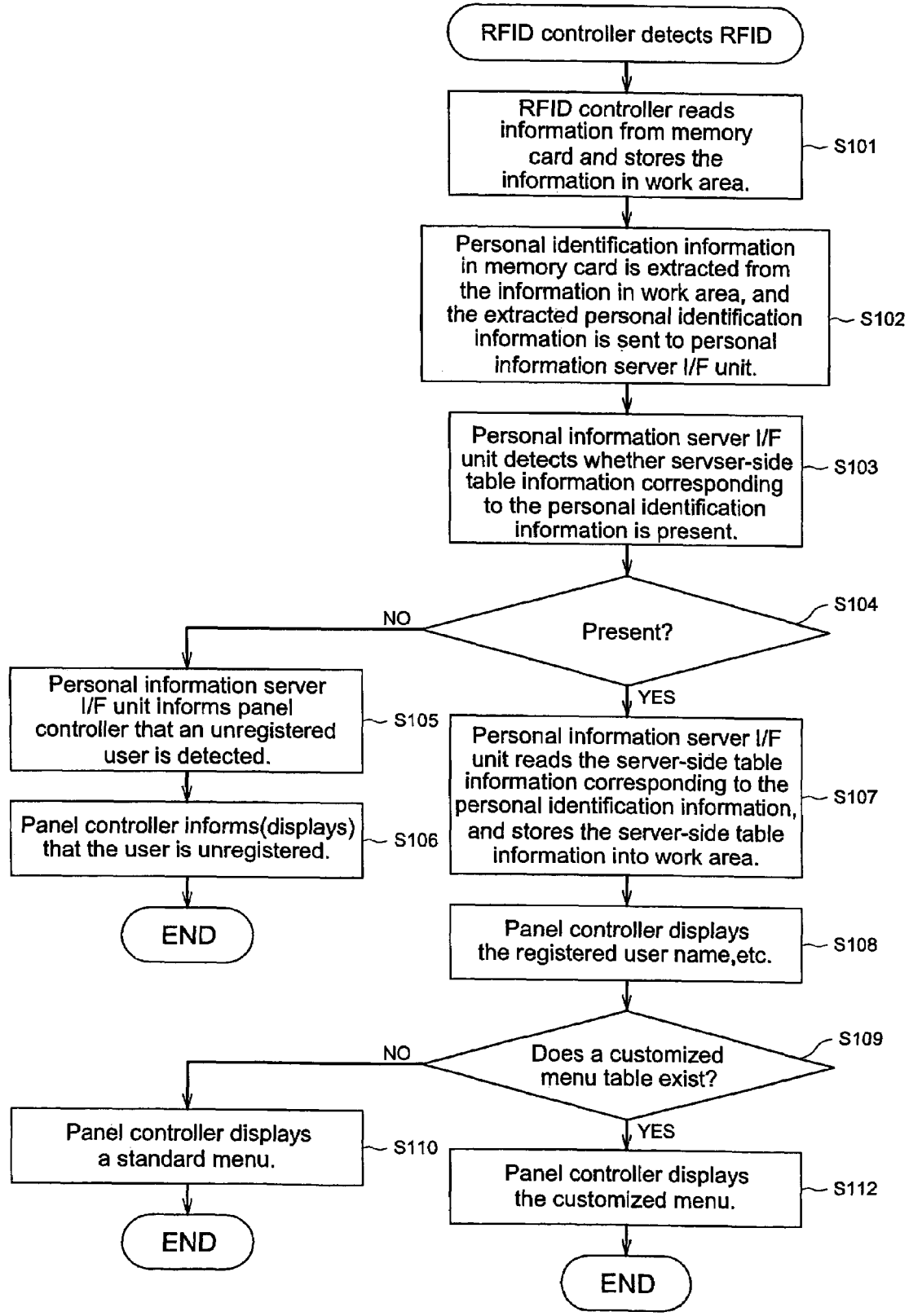
FIG. 6 is a flowchart illustrating an operation from personal authentication to a menu display according to the first embodiment of the present invention.

Next, an operation of the system of this embodiment configured as described above is explained. FIG. 6 is a flowchart illustrating an operation from the time of reading registration information from memory card 300 to the time of display of customized menus. For example, a user having memory card 300 stands in front of multifunction machine 100 to do some jobs.

RFID controller 206 radiates a wireless wave toward memory card 300 held by the user, so as to read the registration information in memory card 300, and stores the read information into work area 211 (S101). As shown in FIG. 3, memory card 300 includes user ID 301 of the user. Personal information controller 207 extracts the user ID from the registration information stored in work area 211, and gives the extracted information to personal information server I/F unit 208 (S102).

Personal information server I/F unit 208 issues a personal authentication request based on the user ID 301 to the personal information server 102 (S103).

Upon receiving the personal authentication request with user ID 301 from personal information server I/F unit 208, personal information server 102 determines whether a personal information table corresponding to the user ID 301 is registered (S104). As shown in FIG. 5, each personal information table includes user ID 310. Accordingly, when there is a personal information table including user ID 310 that matches user ID 301, it is determined that the user's personal information table is registered in personal information server 102. When the user's personal information table is registered, personal information server 102 sends a response including "registered user detection notification," in response to the personal authentication request. When the user's personal information table is not registered, personal information server 102 sends a response including "unregistered user detection notification."

When personal information server I/F unit 208 receives the "unregistered user detection notification," personal information controller 207 gives the received "unregistered user detection notification" to panel controller 205 (S105). When the "unregistered user detection notification" is given, panel controller 205 controls touch panel 204 to display a message indicating that the user is not registered (S106). FIG. 7A shows an example of a message displayed on touch panel 204 indicating that a user is not registered.

On the other hand, when "registered user detection notification" is received at S104, personal information server I/F unit 208 stores the user's personal information table data received from personal information server 102 into work area 211 (S107). Further, personal information server I/F unit 208 commands panel controller 205 to display the registered user name, and so on (S108).

FIG. 7B is an example of a message displayed on touch panel 204 indicating confirmation of a registered user.

Thus, RFID controller 206 reads the registration information stored in memory card 300 held by a user without contact, personal information server 102, which is separately installed from multifunction machine 100, performs personal authentication, and the result of the authentication is displayed on multifunction machine 100. Accordingly, personal authentication can be performed without user's input of a user ID or a code number through touch panel 204 or operation buttons (not shown).

After RFID controller 206 completes the personal authentication based upon the registration information read from memory card 300 as described above, it is determined whether the currently authenticated user's customized menu table is present (S109). When the personal information table data stored in work area 211 at step S107 includes a customized menu table, it is determined that the user's customized menu table is present. When the personal information table data does not include a customized menu table, it is determined that the user's customized menu table is not present.

When personal information server 102 stores personal information for personal authentication, but does not store a customized menu, which is a user's original menu, it is determined that the user's customized menu table is not present. In this case, personal information controller 207 commands panel controller 205 to display a standard menu (S110). In other words, a personal-authenticated user can use at least a standard menu, even if a customized menu has not been registered in personal information server 102.

Figure 8A:
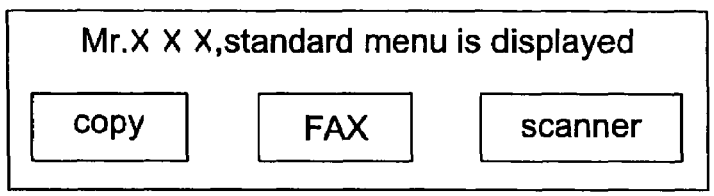
FIG. 8A is an example of a standard menu display.

The standard menu is a menu other than the customized menus, and can be a default menu screen prepared by a maker (manufacturer). Panel controller 205 stores thus prepared default menu screen data. For example, the default menu screen can include some selection buttons of basic functions, such as a facsimile function, copy function, scanner function, printer function, and an electronic mail function. Settings necessary to perform each function (such as resolution, paper feed setting, paper catch setting, paper size, number of copies, destination telephone number, destination mail address, etc.) are determined by default values or user input values at each time of use. FIG. 8A is an example of a standard menu display. Selection buttons of "copy," "FAX" and "scanner" are displayed in association with a copy function, a facsimile function and a scanner function. "Mr. **" is the name of a personal-authenticated user.

Figure 8B:
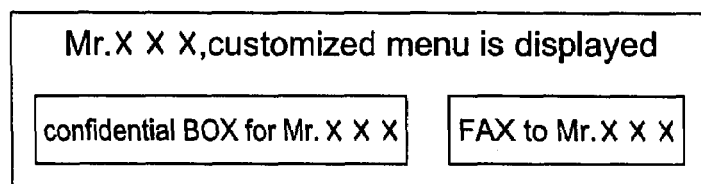
FIG. 8B is an example of a customized menu display.

On the other hand, when it is determined at step S109 that the customized menu table is present, panel controller 205 displays the customized menu (menu name) (S112). For example, when the personal information table shown in FIG. 5 is stored in work area 211, menu names respectively given to customized menu tables 312-1 through 312-n are displayed on touch panel 204 (S112). FIG. 8B is an example of a customized menu display.

Thus, RFID controller 206 performs personal authentication based on the registration information read from memory card 300, and customized menus registered for the authenticated user in personal information server 102 are automatically displayed on touch panel 204. Accordingly, mere user's standing in front of multifunction machine 100 creates a status that allows the user to select customized menus registered by the user through touch panel 204.

Next, an operation of selecting a desired menu from the customized menus displayed on touch panel 204 is explained with reference to FIGS. 9 and 10. The screen shown in FIG. 8B is an example of a display status before a training menu is reflected (used).

Before the customized menus are displayed on touch panel 204, it is determined whether the registration information read from memory card 300 and stored into work area 211 includes a training menu table (S201). As shown in FIG. 3, when the training menu tables have been registered in memory card 300, the item of training menu table number 302 includes a numeral value. It can be determined whether a training menu table is present by checking the numeral value in the training menu table number 302.

Figure 8C:
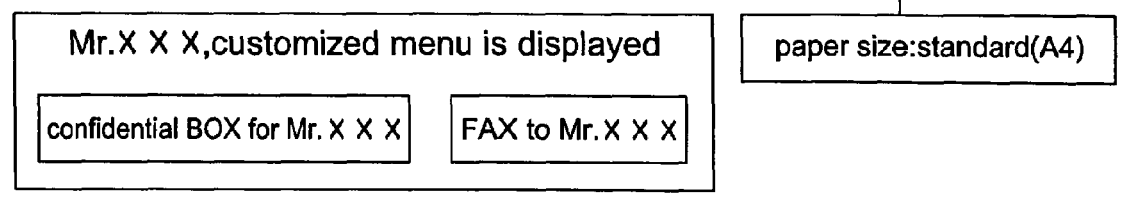
FIG. 8C is an example of a customized menu display when data is not registered in a training menu table.

When it is determined that a training menu table is not registered, the operation proceeds to step S202 in which panel controller 205 displays standard settings. FIG. 8C is an example of a display of customized menus with standard settings. "Mr. private box" and "Fax to Mr. " are customized menus.

Thus, when the customized menus have been registered in personal information server 102, but memory card 300 does not include training menu tables corresponding to the customized menus, message 401 indicating that a default value is set to panel controller 205, is displayed. FIG. 8C shows that the paper size is a default setting. Other items, such as resolution, the number of copies, etc., can also be displayed.

Figure 8D:
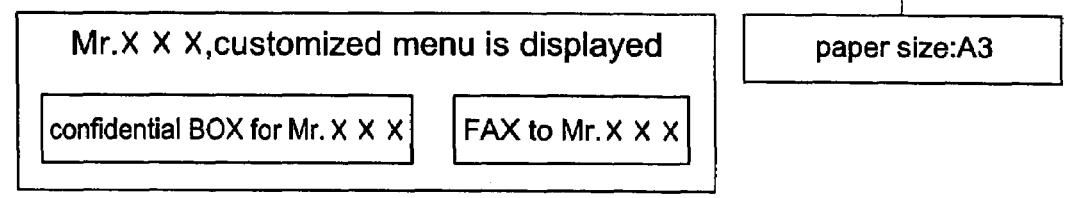
FIG. 8D is an example of a customized menu display when data is registered in a training menu table.

When it is determined that the training menu table is registered, the operation proceeds to step S203 to read training menu table data from work area 211 and to display message 402 indicating that the setting value is customized in accordance with the read training menu table data. FIG. 8D shows message 402 indicating that the paper size is set for A3 size, since the item of "paper size" in the training menu table shown in FIG. 4 includes "A3." When the customized information (setting value) is included in other items, such as resolution or the number of copies, in the training menu table, such information can also be displayed.

Next, the user selects a desired menu (standard/customized) through touch panel 204. A touch of a menu displayed on touch panel 204 indicates an input of an execution command of a particular menu specified based upon the touch position (S204).

The training menu table corresponding to the user's selected customized menu includes setting information (resolution, number of copies, destination, etc.) necessary for execution of the menu. The setting information with respect to the menu to which an execution command is input at S204 is sent from work area 211 to panel controller 205, and is stored as panel setting information.

Panel controller 205 confirms each type of panel setting information (resolution, number of copies, destination, etc.) (S205). More in detail, when a command to change the panel setting information is input through touch panel 204 or operation buttons (not shown), the selected setting information is changed according to the contents of the command. The setting information after the change is reflected on the panel setting information.

Assume that the panel setting information is changed. For example, the paper size is changed from A4 to A3. Panel controller 205 rewrites the paper size item in the training menu table from A4 to A3. When other items are changed, the corresponding items in the training menu table are rewritten as well.

The training menu table data thus changed is stored (registered) in memory card 300 again. Therefore, it is determined whether the panel setting information has been changed (S206). When the setting has been changed, panel controller 205 informs RFID controller 206 of the changed training menu table data, and commands RFID controller 206 to write the data into memory card 300 (S207). RFID controller 206 writes the changed training menu table data into memory card 300 via a wireless wave without contact.

Next, panel controller 205 gives the held panel setting information to job controller 203, and informs job controller 203 of the start of a job (S208).

Job controller 203 is controlled by WEB server 105 using the remote procedure method to perform a menu according to the panel setting information. More in detail, WEB server 105 holds operation screen data necessary for the execution of each job with respect to all menus (including customized menus for an individual user). WEB server 105 retrieves a necessary operation screen along with the progress of the job and sends it to multifunction machine 100, in response to a request from multifunction machine 100. At multifunction machine 100, job controller 203 gives the operation screen data to panel controller 205 to display the operation screen on touch panel 204. Job controller 203 detects an input on the operation panel displayed on touch panel 204, and outputs commands to corresponding one of device controllers 202-1 through 202-n. At this moment, the commands are generated based on the panel setting information. For example, "A3" will be selected as a paper size. In addition, job controller 203 requests WEB server 105 to send the next operation screen in response to an input from touch panel 204. Thus, requests and distributions of operation screens are performed between multifunction machine 100 and WEB server 105 in order to perform jobs corresponding to the selected menu.

Thus, when the customized menu is selected, a job is performed based on the corresponding training menu table. Accordingly, the setting contents set by the user in the execution of the preceding job are reproduced. Further, when the contents of the panel setting information are changed in the execution of the current job, the changed contents are reflected on the training menu table and then written in memory card 300. Accordingly, memory card 300 always stores the latest setting information.

Figure 10:
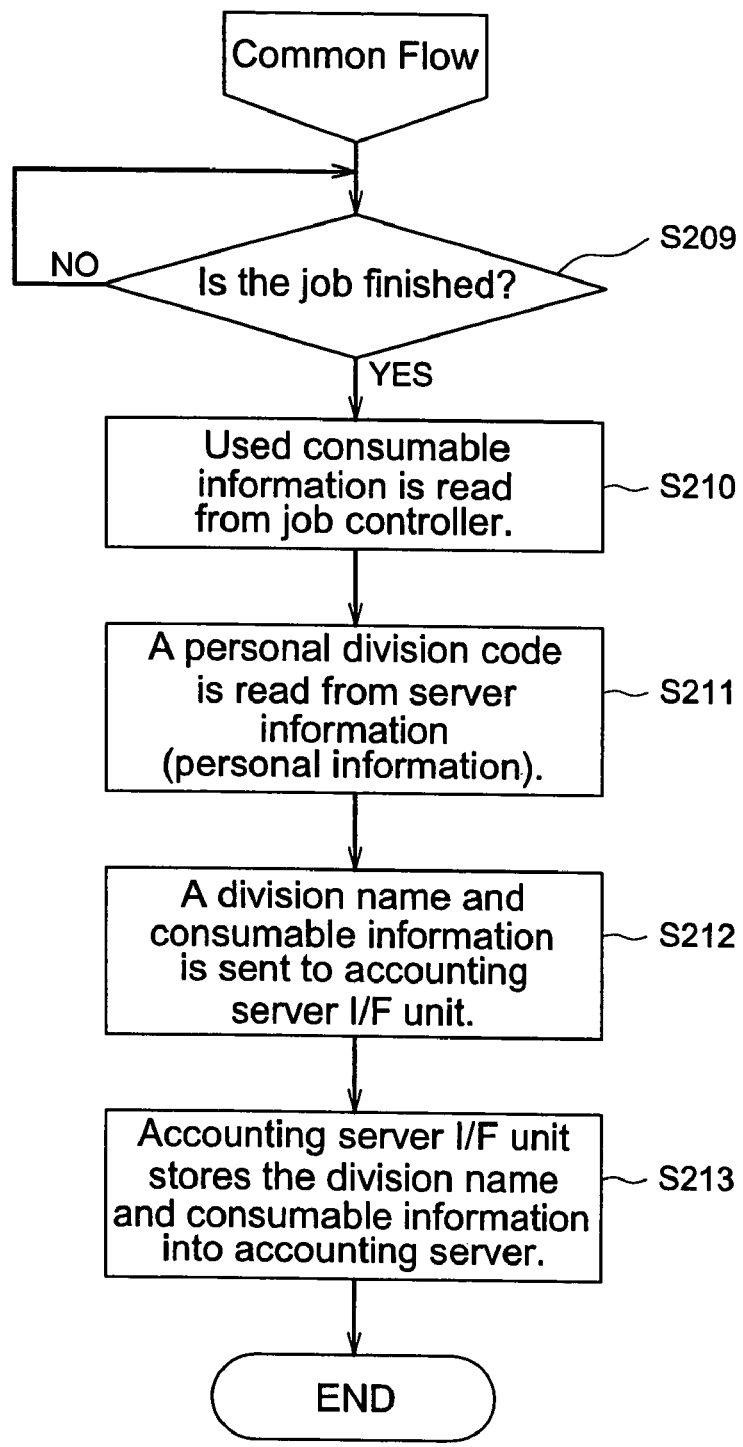
FIG. 10 is a flowchart illustrating an operation after a job is finished at the multifunction machine according to an embodiment of the present invention.

FIG. 10 is a flowchart illustrating an operation after the execution of the job. Job controller 203 stores and manages consumable information per job as a unit. When the job with respect to the menu selection finishes (S209), the used consumable information is read from job controller 203 (S210). A division code is read from personal information 311 stored in work area 211 (S211). The division name and consumable information are sent to accounting server I/F unit 209 (S212). Then, accounting server I/F unit 209 accesses accounting server 103 and requests registration of the user's division name and consumable information (S213). Upon receiving the registration request from accounting server I/F unit 209, accounting server 103 registers the received division name and consumable information. For example, when consumables are managed per division, the amount of the consumable is added to each corresponding division.

As described above, RFID controller 206 performs personal authentication based upon the registration information read from memory card 300, and after the execution of the job, consumable information incurred from the job execution is written into accounting server 103 per division or individual, by using the result of personal authentication. Accordingly, the consumables can be easily managed per individual or division according to the rigid personal authentication without bothering the user.

In the above explanation, personal information server 102 and accounting server 103 are implemented on separate servers. However, they can be implemented on a physically common server. Further, WEB server 105 controls jobs of multifunction machine 100 by the remote procedure method in the above explanation. However, personal information server 102 can perform the same remote procedure function, instead. Alternatively, personal information server 102 and accounting server 103 can be located on the Internet.

In the above embodiment, memory card 300 shown in FIG. 3 stores training menu table information. Alternatively, personal information server 102 can store training menu table number 302 and training menu tables 303 in the personal information table.

Figure 11:
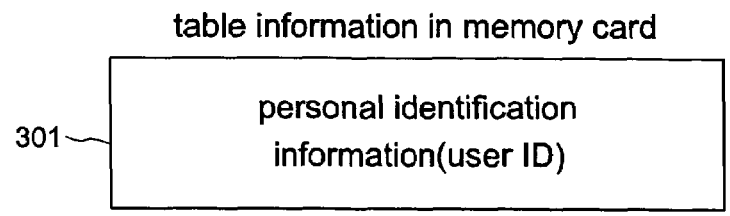
FIG. 11 illustrates registration information in a memory card that stores only user IDs.

FIG. 11 illustrates registration information stored in memory card 300 in this variation. As shown in this figure, memory card 300 stores only user ID 301 as personal identification information. It is preferable that only the user ID 301 is stored as registration information in the memory card 300 from the aspect of security.

Figure 12:
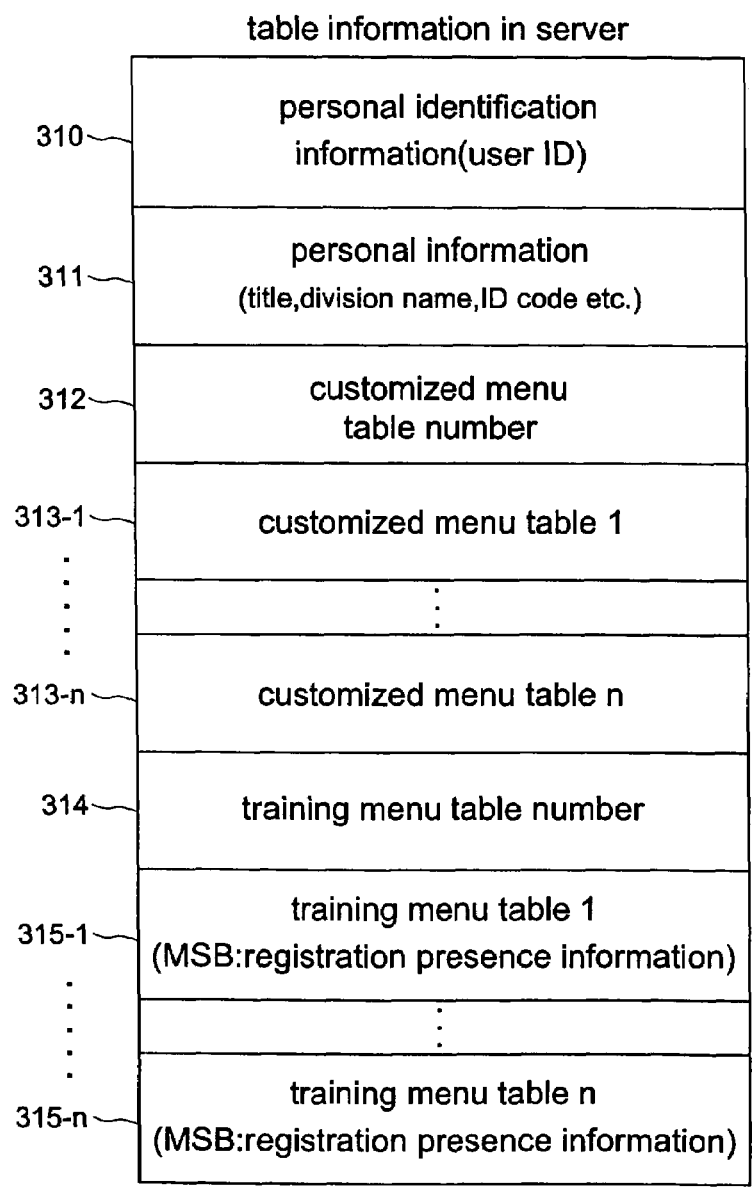
FIG. 12 is an example of data structure of a personal information table that stores customized menu tables and training menu tables.

FIG. 12 illustrates data structure of user's personal information table in this variation. Personal information table includes user ID 310, personal information 311, including a division name, etc., registered customized menu table number 312, and registered customized menu tables 313-1 through 313-n (n: natural number). The personal information table further includes training menu table number 314 and individual training menu tables 315-1 through 315-n (n: natural number). Customized menus for each user are registered in personal information server 102, and multifunction machine 100 can read and execute the customized menu. Setting contents with respect to the customized menu executed in the past at multifunction machine 100 are registered as training results in training menu table 315.

The operation using the above-described memory card 300 is explained. First, an operation from reading registration information from memory card 300 to displaying a customized menu is explained. Because the basic operation is the same as that of the flowchart shown in FIG. 6, only the difference is explained here. In this variation, the processes shown in steps S101, S102 and S107 are different from those in FIG. 6. In other words, in the previous embodiment, the registration information that is read from memory card 300 in step S101 includes the information with respect to the training menu tables (302, 303). On the other hand, only the user ID 301 is included in this variation. Thus, an operation to extract user ID 301 from the registration information read from memory card 300 is not necessary. Accordingly, user ID 301 read from memory card 300 can be given to personal information server I/F unit 208 without being stored in the work area, to request personal information server 102 to perform personal authentication (S101, S102). Further, the table information read out from personal information server 102 and read in multifunction machine 100 includes training menu table number 314 and training menu tables 315-1 through 315-$n$ (n: natural number). Accordingly, training menu table number 314 and training menu tables 315-1 through 315-$n$ are downloaded in multifunction machine 100 at this time. The other processes are the same as those shown in FIG. 6.

Next, an operation for selecting a desired menu from the customized menus displayed on touch panel 204 is explained. Because the basic operation is the same as that shown in the flowchart of FIG. 9, only the difference is explained here. In this variation, the processes of steps S201 and S207 are different from those shown in FIG. 9. In other words, in the previous embodiment, training menu information is retrieved from the registration information read from memory card 300. On the other hand, training menu information is retrieved from the information read from personal information server 102 in this variation. Further, when it is determined in step S206 shown in FIG. 9 that the setting has been changed, the changed contents are stored (registered) as training menus in the personal information table in personal information server 102. In the previous embodiment, the changed contents are stored as training menus in memory card 300 in step S207. Other processes are the same as those shown in the flowchart of FIG. 9.

In the above explanation, the multifunction machine 100 does not have personal authentication (identification) information, but personal information server 102 stores personal authentication information and performs personal authentication in response to the request from the multifunction machine 100. However, multifunction machine 100 can store (register) the personal information table and the customized menus.

The second embodiment of the present invention will be explained hereinafter. In the second embodiment, the multifunction machine stores the personal information table and the customized menus, and the multifunction machine alone performs personal authentication and displays customized menus.

Figure 13:
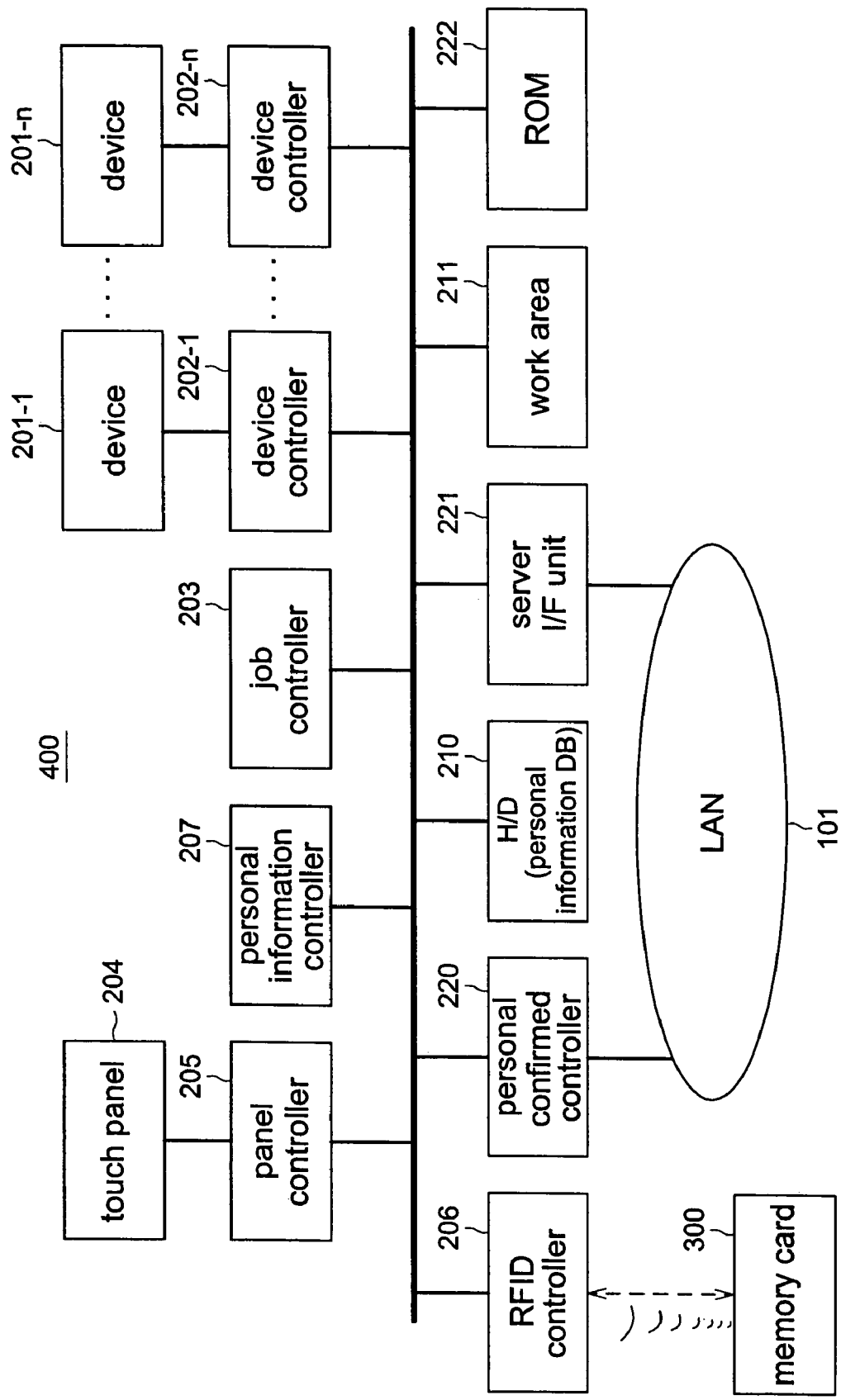
FIG. 13 is a functional block diagram of a multifunction machine according to a second embodiment of the present invention.

FIG. 13 is a functional block diagram illustrating multifunction machine 400 according to the second embodiment of the present invention. The functions same as those of multifunction machine 100 of the first embodiment shown in FIG. 2 have the same reference numerals. Personal authentication controller 220 performs personal authentication by comparing the personal information read from memory card 300 by RFID controller 206 with registered personal information. The registered personal information is previously stored in hard disk 210. Server I/F unit 221 is an interface to access servers on LAN 101 or servers outside of LAN 101 via LAN 101. The network configuration can be that shown in FIG. 1. Multifunction machine 100 shown in FIG. 1 corresponds to multifunction machine 400 in this embodiment.

Multifunction machine 400 stores control programs to control operations of devices 201-1 through 201-$n$ and other programs in ROM 222. Multifunction machine 400 expands data in work area 211, implemented by a RAM, to perform necessary operations. The functional blocks, such as job controller 203, personal information controller 207 and personal authentication controller 220, are implemented by a CPU (not shown) cooperating with relating hardware to perform processes in accordance with program commands.

Memory card 300 stores personal information shown in FIG. 3. In other words, memory card 300 stores registration information, including user ID 301 as personal identification information, training menu table number 302, respective training menu tables 303-1 through 303-$n$. Multifunction machine 400 stores customized menus for respective users in hard disk 210, and can read the customized menus to execute. Multifunction machine 400 stores (registers) training results, which is the setting contents when the customized menus were executed in the past, in memory card 300. The data structure of the training menu table is the same as that shown in FIG. 4.

Multifunction machine 400 stores each user's personal information table, which is individual registration information, in hard disk 210. In this embodiment, the personal information table has the same data structure shown in FIG. 5. In other words, the personal information table includes user ID 310 as personal identification information, personal information 311, such as an individual name and a division name, registered customized menu table number 312, and registered customized menu tables 313-1 through 313-$n$. User ID 310 is common to user ID 301 shown in FIG. 3. Such customized menu table data is read from hard disk 210, and "menu names" of the customized menus are displayed on the panel.

Figure 14:
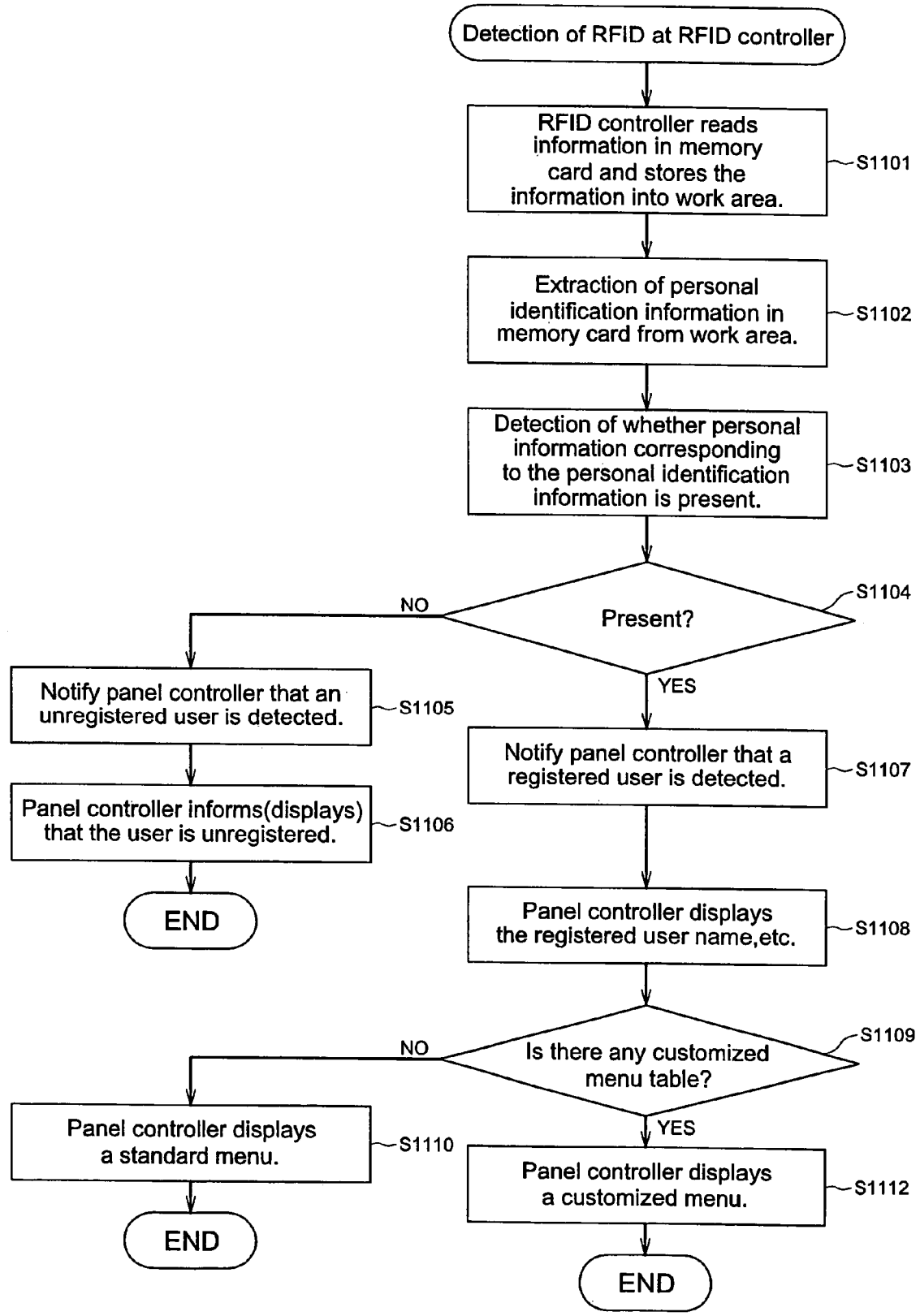
FIG. 14 is a flowchart illustrating an operation from personal authentication to display of a menu at the multifunction machine according to the second embodiment of the present invention.

Next, an operation of the system configured as described above is explained according to the second embodiment. FIG. 14 is a flowchart illustrating an operation from reading registration information from memory card 300 to displaying customized menus. For example, a user having memory card 300 stands in front of multifunction machine 400 to perform some desired jobs.

RFID controller 206 radiates a wireless wave toward memory card 300 held by the user to read (registration) information in the memory card 300, and stores the read information into work area 211 (S1101). As shown in FIG. 3, memory card 300 includes user ID 301 of the user. Personal information controller 207 extracts the user ID from the registration information stored in work area 211, and gives the extracted user ID to personal authentication controller 220 (S1102). Alternatively, personal authentication controller 220 may extract the user ID from work area 211.

Personal authentication controller 220 determines whether there is a personal information table having user ID 310 matching user ID 301 obtained in step S1102 in hard disk 210 (S1103). The presence of a registered personal information table having user ID 310 matching user ID 301 means that the user's personal information table is registered in hard disk 210. When the personal information table is registered, personal authentication controller 220 determines that the personal information table "exists" (S1104), and sends "registered user detection notification" to panel controller 205 (S1107).

Upon receiving an "unregistered user detection notification" (S1105), panel controller 205 displays a message indicating an unregistered user on touch panel 204 (S1106). FIG. 7A is an example of a message of an unregistered user displayed on touch panel 204.

On the other hand, when panel controller 205 receives a "registered user detection notification," panel controller 205 displays registered user's name, and so on (S1108). The registered user's name can be obtained from personal information 311 shown in FIG. 5. FIG. 7B is an example of a message indicating a registered user displayed on touch panel 204.

As described above, RFID controller 206 reads registration information stored in memory card 300 held by the user without contact, personal authentication is performed on multifunction machine 400, and the result of the authentication is displayed on multifunction machine 400. Accordingly, personal authentication can be performed without user's input of a user ID or a code number through touch panel 204 or operation button (not shown), etc.

After the personal authentication based on the registration information read from memory card 300 by RFID controller 206 is completed as described above, it is determined whether a customized menu table of the currently authenticated user is present (S1109). When the personal information table data (FIG. 5) stored in hard disk 210 includes a customized menu table, it is determined that the customized menu table is present. When the personal information table data does not include any customized menu table, it is determined that the customized menu table is not present.

When hard disk 210 stores personal information for personal authentication, but does not store a customized menu, which is a personal menu, it is determined that a customized menu table is not present. In this case, panel controller 205 displays a standard menu on touch panel 204 (S1110). In other words, the personal authenticated user can use a standard menu, even though his/her customized menu is not registered in multifunction machine 400.

On the other hand, it is determined in step S1109 that a customized menu table is present, panel controller 205 displays customized menus (menu names) (S1112). When the personal information table shown in FIG. 5 is stored in work area 211, menu names set to (given to) respective customized menu tables 313-1 through 313-n are displayed on touch panel 204 (S112). FIG. 8B shows an example of a display of the customized menus.

As described above, the personal authentication is performed based upon the information read from memory card 300 by RFID controller 206, and multifunction machine 400 automatically displays the customized menu previously registered by the user in multifunction machine 400 on touch panel 204. Accordingly, mere user's standing in front of multifunction machine 400 makes the user's registered customized menus ready to be selectable through touch panel 204.

Next, a desired menu is selected from the customized menus displayed on touch panel 204. Multifunction machine 400 reflects the registration information in the training menus on the displayed contents in accordance with the flowchart shown in FIG. 9 (FIGS. 8C and 8D). Further, when the setting contents are changed, the changed data is reflected on the training menu tables in memory card 300. Then, multifunction machine 400 executes a selected job. After the execution of the job, consumable information is registered (stored) in accounting server 103 in accordance with the flowchart shown in FIG. 10.

In the second embodiment, memory card 300 stores information regarding training menu tables. However, the information stored in memory card 300 can be limited to the user ID, and other information can be stored in the personal information table in multifunction machine 400.

In step S1102 shown in FIG. 14, the user ID is extracted from the work area. Meanwhile, the extracting operation performed in step S1102 is not necessary in this construction (variation), because the registration information itself read from memory card 300 is the user ID.

In addition, the personal-authenticated user's personal information table must be read from hard disk 210 and be stored into the work area.

Figure 9:
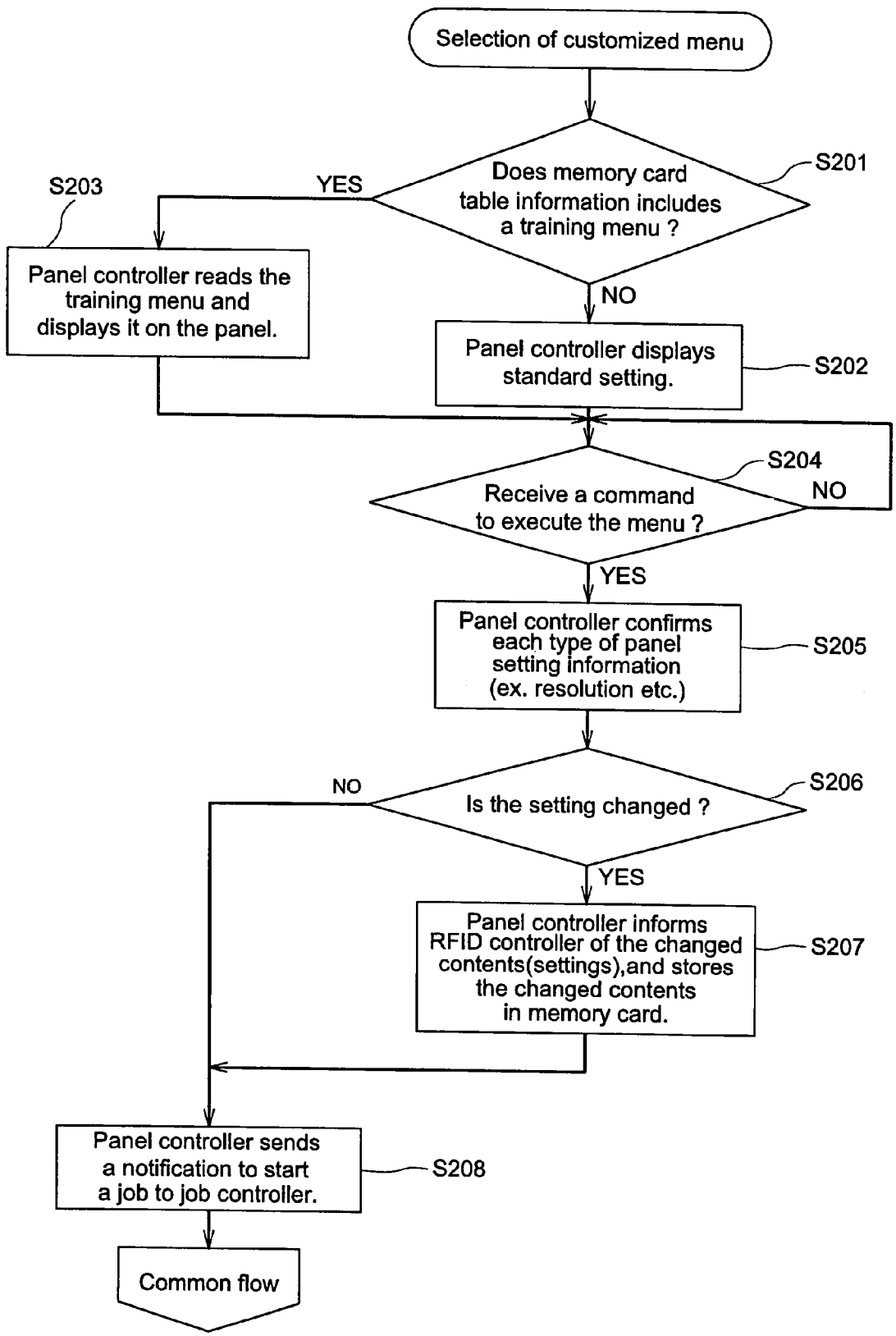
FIG. 9 is a flowchart illustrating an operation after a selection of a customized menu at the multifunction machine according to an embodiment of the present invention.

In the operation after the selection of a customized menu, the registration information stored in memory card 300 is searched for the training menu table information in step S201 shown in FIG. 9. However, in this construction (variation), a personal information table as the registration information of hard disk 210 is searched to find the training menu table information.

In addition, when the setting contents are changed during the execution of a job, the changed contents are registered (trained) in memory card 300 in step S207 shown in FIG. 9. On the other hand, in this construction, because the training menus in the personal information table must be changed, the changed contents are registered in hard disk 210. The other processes are the same as those in the second embodiment.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application Nos. 2004-3839, 2004-3840, 2004-13419 and 2004-13420, filed on Jan. 9, 2004, Jan. 21, 2004, entire content of which is expressly incorporated by reference herein.

What is claimed is:

1. A multifunction machine, comprising:
    an RFID controller that reads identification information of a user from a memory card via a wireless wave;
    a personal information server interface unit that sends a personal authentication request and the identification information to a personal information server, and receives one or more customized menus which are customized for the user from the personal information sewer, when the personal information sewer authenticates the user; and
    a display that displays the one or more customized menus, wherein the RFID controller reads setting information for one or more settings corresponding to the one or more customized menus from the memory card, and sets or changes the setting information in the memory card when a setting for a job selected from one of the customized menus is set, when the user sets or changes one of the settings, the RFID controller sets or changes the setting information in the memory card before the multifunction machine initiates a job using the set or changed setting, and wherein the multifunction machine tracks consumable information and associates the consumable information with at least one of the user and the user's division, based on the identification information of the user.

2. The multifunction machine as recited in claim 1, wherein the multifunction machine performs a plurality of functions, including a print function.

3. The multifunction machine as recited in claim 1, wherein the display displays a message indicating that the user is authenticated when the personal information server authenticates the user.

4. The multifunction machine as recited in claim 1, wherein the display displays the setting information in association with one or more of the customized menus.

5. The multifunction machine as recited in claim 1, further comprising a job controller that controls a job selected from one of the customized menus based on the setting information.

6. The multifunction machine as recited in claim 1, wherein the multifunction machine uses standard settings for settings that do not have corresponding setting information stored in the memory card.

7. A method of operating a multifunction machine, comprising:

reading identification information of a user from a memory card via a wireless wave;

sending a personal authentication request and the identification information to a personal information server;

receiving one or more customized menus which are customized for the user from the personal information server, when the personal information server authenticates the user;

reading setting information for one or more settings corresponding to the one or more customized menus from the memory card;

displaying the one or more customized menus;

selecting a job from one of the customized menus;

setting or changing a setting for the selected job;

setting or changing setting information corresponding to the set or changed setting for the selected job in the memory card;

initiating the job after setting or changing the setting information in the memory card;

tracking consumable information; and associating the consumable information with at least one of the user and the user's division, based on the identification information of the user.

8. The method as recited in claim 7, further comprising displaying a message on a display of the multifunction machine indicating that the user is authenticated when the personal information server authenticates the user.

9. The method as recited in claim 7, wherein the setting information is displayed in association with the displayed customized menus.

10. The method as recited in claim 7, further comprising operating the multifunction machine using standard settings for settings that do not have corresponding setting information stored in the memory card.

* * * * *